United States Patent [19]

Azad

[11] Patent Number: 4,730,324

[45] Date of Patent: Mar. 8, 1988

[54] METHOD AND APPARATUS FOR COMPENSATING FOR WAVE FRONT DISTORTION IN A SLAB LASER

[75] Inventor: Farzin H. Azad, Clifton Park, N.Y.

[73] Assignee: General Electric Company, Schenectady, N.Y.

[21] Appl. No.: 914,431

[22] Filed: Oct. 2, 1986

[51] Int. Cl.⁴ .............................................. H01S 3/00
[52] U.S. Cl. ...................................... 372/33; 372/72; 372/99; 372/66
[58] Field of Search ..................... 372/33, 34, 66, 72, 372/92, 99, 69–71

[56] References Cited

U.S. PATENT DOCUMENTS

| | | | |
|---|---|---|---|
| 3,577,098 | 5/1971 | Winston | 372/33 |
| 3,609,584 | 9/1971 | Stitch et al. | 372/33 |
| 3,628,180 | 5/1969 | Segre | 372/33 |
| 3,633,126 | 1/1972 | Martin et al. | 372/35 |
| 3,646,474 | 2/1972 | Segre | 372/66 |
| 3,700,423 | 10/1972 | Kantorski | 372/33 |
| 3,798,571 | 3/1974 | Segre | 372/33 |
| 4,021,754 | 5/1977 | Colao | 372/107 |
| 4,199,735 | 4/1980 | Chadwick et al. | 372/33 |

Primary Examiner—James W. Davie
Assistant Examiner—Randolph B.
Attorney, Agent, or Firm—Richard V. Burgujian; James C. Davis, Jr.; Paul R. Webb, II

[57] ABSTRACT

An optically pumped slab laser includes a solid-state lasing medium having a longitudinally extending lasing axis. A lamp is disposed proximate the lasing medium for emitting optical pumping radiation, and a reflector surrounds the lamp for directing the radiation at selected portions of the lasing medium. A fluid coolant is flowed across a major surface of the lasing medium to remove heat therefrom. The lasing medium exhibits a typical negative focal power lens effect distortion in portions proximate its lateral edges. The reflector is shaped to introduce a positive lens effect distortion, equal in magnitude to the negative lens effect distortion, to a central portion of the lasing medium between the lateral edge portions. External reflectors are positioned so as to direct a subsequently generated laser beam through alternate regions exhibiting the positive and negative focal power lens effect distortions, so that the beam subsequently exits the slab laser with no net distortion.

22 Claims, 7 Drawing Figures

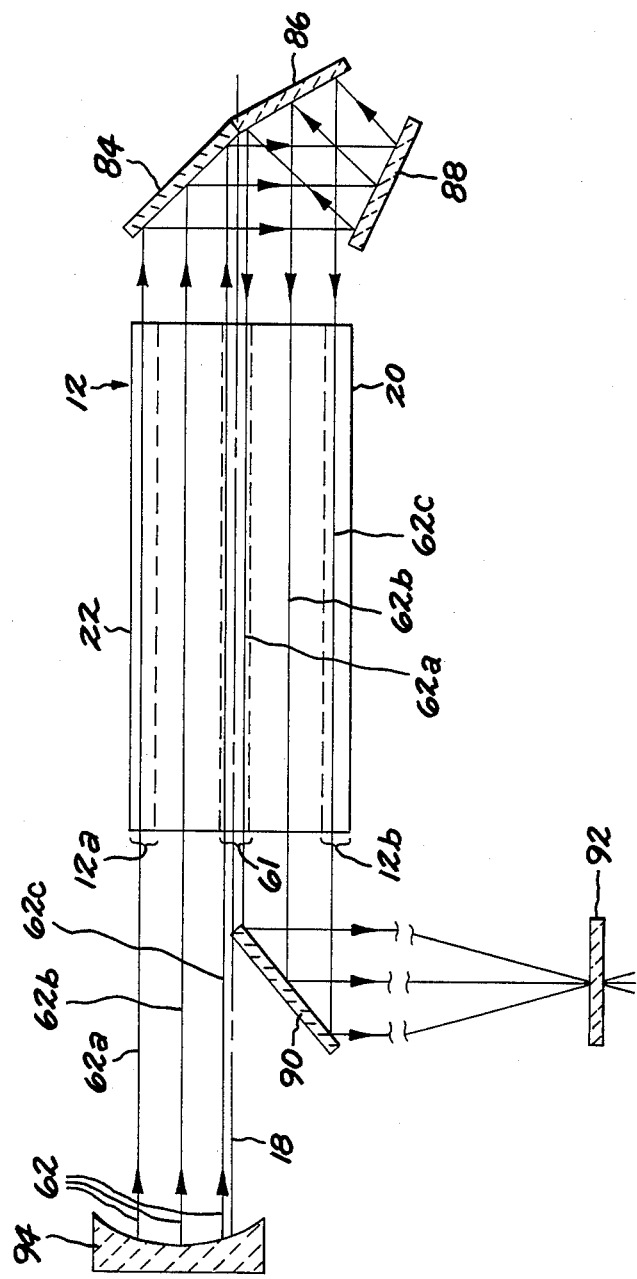

METHOD AND APPARATUS FOR COMPENSATING FOR WAVE FRONT DISTORTION IN A SLAB LASER

This invention relates generally to lasers and more specifically to fluid cooled, slab lasers.

BACKGROUND OF THE INVENTION

A typical, optically pumped, fluid cooled, slab laser includes a slab of solid-state lasing medium. Pumping means such as a lamp and reflector are situated so as to impinge optical radiation on the lasing medium whereby to pump the atoms in the lasing medium to a metastable state. A cooling fluid is flowed across at least a portion of the lasing medium to remove heat generated therein by the optical pumping. A laser beam is subsequently produced by passing a beam of coherent light, either externally generated or stimulated within the lasing medium, oscillatingly through the lasing medium. This coherent light beam is amplified with each pass through the lasing medium.

Such slab lasers typically exhibit both width-wise and thickness-wise wave-front distortions of the laser beam, the width-wise distortion being particularly prominent in areas proximate lateral edges of the lasing medium. This wave-front distortion diminishes the usable area of the lasing medium, the efficiency of the slab laser, and the quality of the laser beam. This wave-front distortion is caused by at least three known phenomena, including: (1) width-wise variation of the refractive index of the lasing medium caused by thermal gradients within the lasing medium, i.e. thermal lensing; (2) variations in the refractive index of the lasing medium due to a stress-optic effect initiated by the flow of cooling fluid over the lasing medium; and (3) beam distortion induced by a deformation of major faces of the lasing medium, also caused by the cooling fluid flow over the lasing medium.

U.S. Pat. No. 3,633,126 (Martin et al.), incorporated herein by reference, addresses the problem of thickness-wise variation of the refractive index of the lasing medium. In Martin et al., the beam of coherent light is introduced into the lasing medium in an off-axial direction, such that each ray in the beam is multiply, internally reflected through regions of varying temperatures and refractive indexes during each pass through the lasing medium. These varying refractive indexes in the various lasing medium regions are thereby averaged across the beam, minimizing their distortional affects on the beam. Martin et al., however, does not address width-wise wave-front distortions within the lasing medium.

Several other methods and apparatus have been utilized to correct wave-front distortion in slab lasers. Optical phase conjugation has been found suitable for use with Q-switched, high peak power lasers. However, it is not adaptable to industrial lasers which operate with long pulse widths or in a continuous-wave mode. Adjustment of coolant flow over the edges of the lasing medium slab provides some control over edge distortion, but produces increased stress and thus increased breakage proximate the edges of the slab. Correcting lenses disposed external to the lasing medium can be used to provide some correction for wave-front distortion, but only to uniform spherical distortion and only at one operating power.

Thus, wave-front distortion caused by stress-optic effects and thermal lensing has not been adequately addressed by the prior art. As stated above, these distortions are most dominant proximate lateral edges of the lasing medium, thereby causing users of these slab lasers to avoid utilizing the edges of the lasing medium to generate the laser beam. Typical active lasing mediums, for example slabs of YAG (yttrium aluminum garnet) crystals, are limited in size by current crystal growth technology. Thus, it would provide a substantial benefit to the art if a slab laser could be devised wherein wave-front distortion does not prohibit the full width of the lasing medium from being utilized to generate the laser beam.

SUMMARY OF THE INVENTION

The principal object of the present invention is to compensate for the effects of width-wise wave-front distortion proximate the lateral edges of a lasing medium in a fluid cooled, slab laser such that the entire width of the lasing medium can be used to efficiently generate a high quality laser beam.

Accordingly, there is provided a new and improved laser apparatus including a solid-state lasing medium having a longitudinally extending lasing axis. Pumping means are provided adjacent the lasing medium for impinging electro-magnetic radiation upon the lasing medium. Cooling means are provided for flowing a fluid coolant across at least a portion of the lasing medium, the lasing medium exhibiting a negative optical focal power lens effect in lateral edge portions thereof. As a feature of the present invention, means are provided for introducing a positive focal power lens effect approximately equal in magnitude to the negative focal power lens effect to a central portion of the lasing medium between its lateral edges. Means are further provided for passing a beam of coherent light having a wavefront including multiple rays at least twice through the lasing medium. As another feature of the invention, the beam is passed through the lasing medium generally along the lasing axis such that the rays in the beam wavefront traverse alternate regions of positive and negative focal powers of approximately equal magnitudes.

A method in accordance with the present invention is performed by providing a slab laser having a lasing medium, pumping means and cooling means of the type described immediately above. The method is performed by introducing a positive focal power lens effect, approximately equal in magnitude to the negative focal power lens effect, to a central portion of the lasing medium. A beam of coherent light is then passed at least twice through the lasing medium such that the rays in the beam wavefront traverse alternate regions of positive and negative focal power lens effects of approximately equal magnitudes.

A preferred embodiment of the invention is implemented in an optically pumped slab laser wherein the pumping means includes a lamp source of optical pumping radiation and a reflector. As a feature of the invention, the reflector is disposed so as to direct a predetermined amount of optical pumping energy at the central portion of the lasing medium. This predetermined amount of optical energy is selected such that sufficient heat is generated to provide the desired, positive focal power lens effects.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which:

FIG. 5 is a schematic representation of a beam propagation system for a laser apparatus constructed in accordance with the present invention.

DETAILED DESCRIPTION OF THE INVENTION

Figure 1:
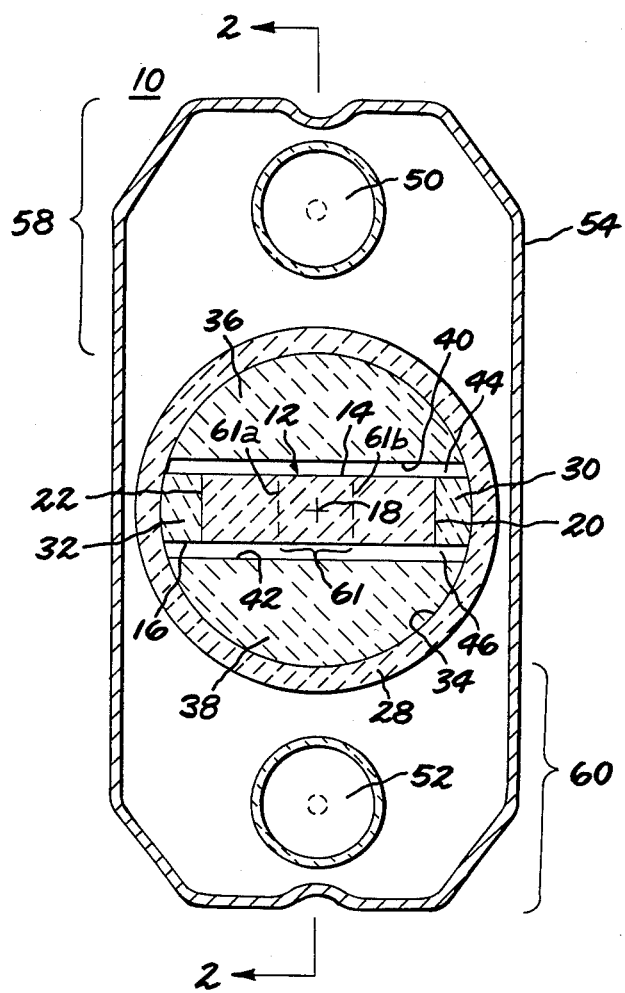
FIG. 1 is a sectional, schematic end view showing a slab laser constructed in accordance with the present invention.
Figure 2:
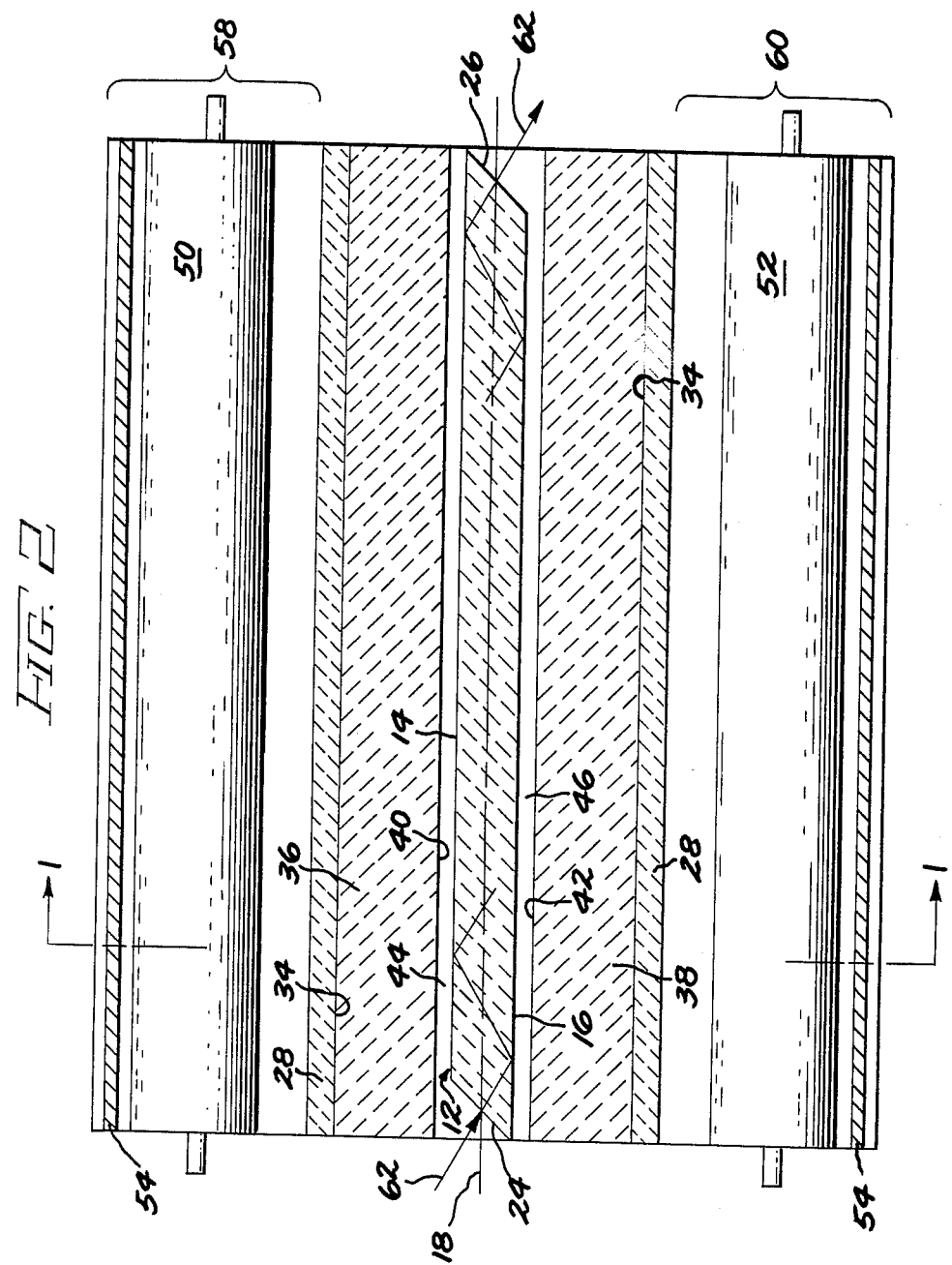
FIG. 2 is a sectional view taken along line 2—2 of FIG. 1.

Referring now to FIGS. 1 and 2, the present invention is shown implemented in a face-pumped, optically-pumped laser device 10. Laser device 10 includes a generally rectangular lasing medium 12, viewed from the end in FIG. 1 and from the side of FIG. 2, comprising a homogeneous body of solid-state lasing material such as yttrium aluminum garnet (YAG) or neodymium doped silicate (or phosphate) glass. Lasing medium 12 includes a pair of opposing face surfaces, 14 and 16, disposed parallel to each other and to a longitudinally extending lasing axis 18. Face surfaces 14 and 16 are polished to optical flatness, i.e. to within about one-eighth of the wavelength of the coherent light emitted by lasing medium 12. A pair of lateral side surfaces 20, 22 are disposed generally perpendicular to face surfaces 14, 16 and parallel to axis 18. Side surfaces 20, 22 are polished to be sufficiently optically clear so as not to interfere with the optical pumping described hereinbelow. A pair of mutually parallel end surfaces 24 and 26 are disposed, as is known in the art, at a predetermined angle, for example 30 degrees, to lasing axis 18. End surfaces 24, 26 are preferably polished to optical flatness.

Lasing medium 12 is situated in a tube 28, the tube extending the length of the lasing medium and being substantially coaxial about lasing axis 18. Tube 28 comprises a material which is transparent to optical radiation, for example optically clear glass. A pair of optically clear glass supports 30, 32 extend between lasing medium side surfaces 20 and 22, respectively, and an inner surface 34 of tube 28 for supporting the lasing medium in a suspended position within the tube. A pair of optically clear glass fillers 36 and 38, each semi-circular in cross-section, are fastened to tube inner surface 34 so as to provide flat glass surfaces 40, 42 spaced from lasing medium face surfaces 14 and 16, respectively.

There is thus defined a fluid channel 44 between filler surface 40 and lasing medium face surface 14, and a fluid channel 46 between filler surface 42 and lasing medium face surface 16.

A lamp 50 in the form of a tube is disposed substantially parallel to and coextensive with face surface 14 of lasing medium 12. Similarly, a lamp 52 in the form of a tube is disposed substantially parallel to and coextensive with face surface 16 of lasing medium 12. Lamps 50, 52 are employed to generate optical radiation and optically pump lasing medium 12, each comprising a flash-type lamp emitting optical radiation in a wavelength suitable for exciting the atoms in lasing medium 12 to a metastable state. For example, xenon flash lamps, which provide a pumping wavelength of between 5,000 and 9,000 angstroms, are suitable for pumping a lasing medium comprising neodymium doped glass. To improve the uniformity of the pumping of lasing medium face surfaces 14 and 16, the radiation emitting portions of lamps 50, 52 each extend the entire length of the lasing medium face surface proximate the lamp.

A reflector 54 surrounds lamps 50, 52, tube 28 and lasing medium 12. Reflector 54 preferably comprises a high-reflectivity reflector optimized for use with high-intensity lamps; for example a water-cooled copper shroud having a silvered or gold plated interior reflecting surface. Reflector 54 includes a generally U-shaped portion 58 surrounding lamp 50 for directing the electromagnetic radiation emitted by lamp 50 to impinge upon surface 14 of lasing medium 12. Similarly, a generally U-shaped portion 60 of reflector 54 surrounds lamp 52 for directing electromagnetic radiation emitted therefrom to impinge upon face surface 16 of lasing medium 12. As a feature of the present invention, reflector 54 is constructed such that portions 58 and 60 concentrate a selected quantity of optical radiation into a central portion 61 (FIG. 1) of lasing medium 12. Central portion 61, delineated by dashed lines 61a and 61b, is substantially centered between side surfaces 20, 22 and extends the length of lasing medium 12. In a manner described in further detail below with respect to FIGS. 3 and 4, the quantity of optical radiation directed to lasing medium portion 61 is selected to generate a predetermined quantity of heat thereat, and hence a predetermined thermal lensing effect thereat.

In operation, in a manner described in the Martin et al. patent referenced hereinabove, lamps 50 and 52 are energized to pump optical radiation into lasing medium 12, and thereby to excite the atoms in the lasing medium to a metastable state. After exciting the atoms in lasing medium 12 to a metastable state, a beam 62 (FIG. 2) of coherent light, generated internally or by another laser device, is oscillatingly passed through lasing medium 12 by multiple internal reflections within the lasing medium in a direction generally along lasing axis 18. Beam 62 is amplified in magnitude during each pass through lasing medium 12. One preferred configuration of optical apparatus which can be used to oscillate and thus amplify beam 62 is shown and described with respect to FIG. 5 herein below. During operation of laser device 10, a cooling fluid (not shown) is flowed over surfaces 14 and 16 of lasing medium 12 via channels 44 and 46, respectively.

The advantages of the present invention will best be understood after consideration of FIG. 3, which illustrates the thermal lensing effects of a lasing medium 12' constructed in accordance with the prior art. By prior art, the Inventor of the present invention refers to laser devices similar to device 10 of FIGS. 1 and 2, but wherein reflector 54 is shaped to relatively evenly direct optical pumping radiation to the entirety of lasing medium face surfaces 14 and 16. Martin et al. is representative of such prior art.

Figure 3A:
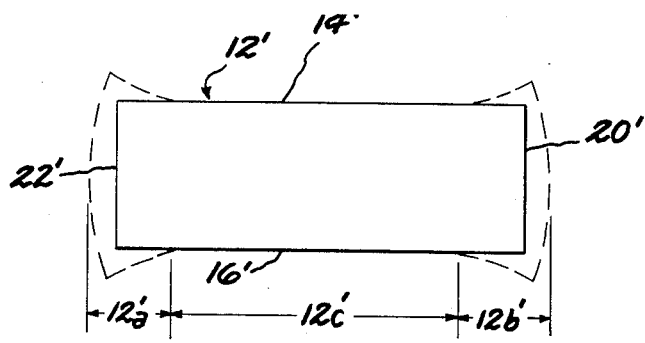
FIG. 3A is a schematic, cross-sectional view of a lasing medium which is uniformly pumped in accordance with the prior art.
Figure 3B:
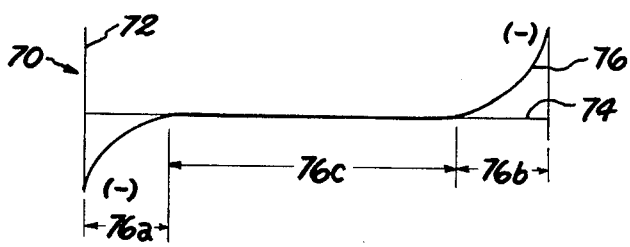
FIG. 3B is a graph showing thermal lensing effects caused by the structural and stress-optic distortions across the width of the lasing medium of FIG. 3A.

As shown in FIG. 3A, in which a lasing medium 12' is viewed from the end, the surface deformation and stress-optic effects described hereinabove cause the deformation, illustrated by dashed lines, of lasing medium 12' in regions 12a' and 12b', proximate lateral edge surfaces 22' and 20' respectively. Lasing medium 12' includes face surfaces 14' and 16'. FIG. 3B shows a graphical illustration 70 including a first axis 72 representing the magnitude of thermal lensing effects in lasing medium 12', and a second axis 74 representing the lateral width of lasing medium 12' between lateral edges 20', 22'. A plot 76 on graph 70 illustrates thermal lensing effects within lasing medium 12' (i.e. the width-wise distortion described hereinabove). Positively sloped portions of plot 76 represent regions of lasing medium 12' exhibiting negative lens effects, while negatively sloped portions (none shown in FIG. 3B) represent regions of the lasing medium exhibiting positive lens effects. Horizontal, unsloped portions of plot 76 represent regions of lasing medium 12' exhibiting no lens effects.

As shown in FIG. 3B by portions 76a and 76b of plot 76, regions 12a' and 12b' of lasing medium 12' exhibit thermal lens effects of equal magnitude and negative focal power. The negative signs enclosed in parentheses indicate that portions 76a and 76b of plot 76 represent regions of negative focal power. Portion 76c' of plot 76 illustrates that lasing medium region 12c' (FIG. 3A) exhibits no thermal lens effects. Portions of a laser beam (i.e. a beam such as beam 62 of FIG. 2) passing through regions 12a' and 12b' of lasing medium 12' would thus exhibit wave-front distortion in relation to the remainder of the beam, substantially decreasing the quality of the laser beam. As described in detail hereinabove, prior to the present invention taught herein, the only practical solution to this wavefront distortion was to avoid using regions 12a' and 12b' of lasing medium 12' to generate a laser beam, and thereby greatly decrease the efficiency of the laser device.

Figure 4A:
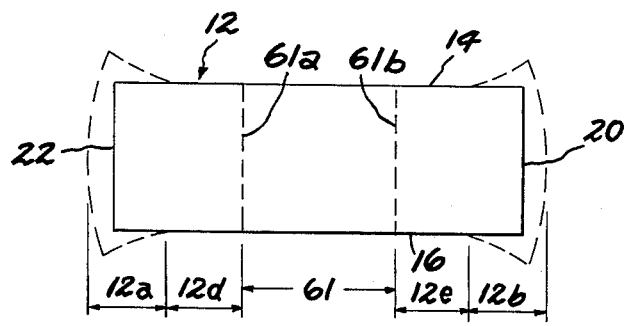
FIG. 4A is a schematic, cross-sectional view of the lasing medium of FIGS. 1 and 2, non-uniformly pumped in accordance with the present invention.
Figure 4B:
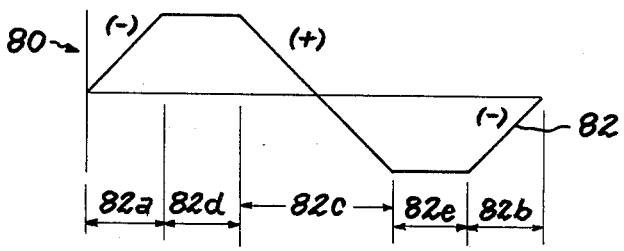
FIG. 4B is a graph showing thermal lensing effects caused by the combination of structural and non-uniform pumping distortions across the width of the lasing medium of FIG. 4A.

FIGS. 4A and 4B illustrate lasing medium 12 of laser device 10 (FIGS. 1 and 2), wherein reflector 54 is modified to introduce a selected amount of optical pumping radiation, hence heat, and hence thermal lens effect into region 61 of the lasing medium. FIG. 4A represents a schematic illustration of lasing medium 12 viewed from the end, including deformed regions 12a and 12b, the deformation in each of these regions being indicated by dashed lines. FIG. 4B illustrates a graphical illustration 80 substantially identical to graphical illustration 70 of FIG. 3B, but with a plot 82 illustrating the thermal lensing effects exhibited by various regions of lasing medium 12. As shown by portions 82a and 82b of plot 82, medium 12 exhibits thermal lens effects of negative focal power in regions 12a and 12b proximate lateral edges 22 and 20, respectively. In accordance with the present invention, region 61 of lasing medium 12 exhibits a thermal lens effect of positive focal power, as shown by portion 82c of plot 82. Regions 12d and 12e of lasing medium 12 exhibit no thermal lensing effects as shown by horizontal plot portions 82d and 82e, respectively. The positive and negative signs in parentheses further serve to indicate the portions of plot 82 respectively representative of regions of positive and negative focal power. It has been discovered by the present inventor that the magnitude of the positive focal power lens effect exhibited in region 61 of lasing medium 12 varies as a function of the magnitude of heat present in that region. In the preferred embodiment of the present invention, the magnitude of the positive focal power induced in region 61 of lasing medium 12 is selected to be equal to the magnitude of the negative focal power lens effect exhibited in lasing medium edge regions 12a and 12b. Relative focal powers are indicated by the relative slopes of various portions of plot 82.

FIG. 5 illustrates a schematic representation of lasing medium 12 viewed from the top, as well as external reflecting optics 84, 86, 88, 90, 92 and 94 positioned so as to direct laser beam 62 through lasing medium 12 in accordance with the present invention. The remaining features of laser device 10 are omitted for clarity. Optical components 84, 86, 88, and 90 comprise 100 percent reflectors, for example flat mirrors. Optical component 94 comprises a 100 percent reflecting spherical mirror, while component 92 comprises a partially reflecting, flat mirror functioning as an output coupler. Beam 62 is shown as comprising three rays 62a, 62b, and 62c and is internally generated within lasing medium 12 in a manner well known to those of ordinary skill in the art. Tracing the path of ray 62a as it reflects from mirror 94, it first passes through region 12a of lasing medium 12 in a direction substantially parallel to lasing axis 18. Thus, upon exiting lasing medium 12 and striking reflector 84, ray 62a exhibits distortion caused by the negative focal power lens effect exhibited in lasing medium region 12a. Ray 62a is reflected from reflector 84, via reflectors 86 and 88, back through region 61 of lasing medium 12. Lasing medium region 61, exhibiting a positive focal power lens effect approximately equal in magnitude to the negative focal power lens effect of lasing medium region 12a, compensates for the distortion induced in ray 62a by lasing medium region 12a. Ray 62a thus exits laser device 10, via mirror 92, with no net distortion. Similarly tracing the paths of rays 62b and 62c, it is seen that ray 62b passes through regions of lasing medium 12 exhibiting no thermal lens effects, while ray 62c acquires a positive focal power lens effect distortion from lasing medium region 61 which is subsequently compensated for by a negative focal power lens effect distortion in lasing medium region 12b. Thus, the entire cross-sectional area of lasing medium 12 is used to generate laser beam 62 which exhibits no net distortion due to thermal lensing. It will be understood that, due to the use of spherical mirror 94, rays 62a, 62b, and 62c eventually converge at mirror 92 in the manner shown. Because of the relatively short distance traveled within lasing medium 12 between mirrors 84, 86, 88, 90, and 92, convergence therein is minimal and not shown in FIG. 5.

It will be appreciated that the exact positioning of the external reflecting optics is not limited to the particular configuration of reflectors described and shown in FIG. 5. Any configuration whereby light rays are alternately passed through regions exhibiting alternating polarity (i.e. positive and negative) focal power lens effects of approximately equal magnitude, whereby to achieve zero net distortion in the laser beam, would suffice. Further, the preferred embodiment of the invention shown and described herein directs the laser beam according to the total internal reflection method shown in Martin et al., thus also eliminating distortion in the thickness-wise direction of lasing medium 12. It will be appreciated that these multiple internal reflections in the thickness-wise direction (i.e. in accordance with Martin et al.) are not visible in the view of FIG. 5. Note also that surfaces 24 and 26 are intentionally not shown in FIG. 5 so as not to distract from the pertinent features presented therein.

As stated above, the present invention is preferably practiced by introducing a positive focal power lens effect in region 61 of lasing medium 12 by modifying reflector 54 to direct an appropriate amount of optical radiation and hence generate an appropriate amount of heat thereat. For example, and without limitation, a process for determining an appropriate shape for reflector 54 can be implemented on a general purpose computer using ray tracing and optimization programs well known to those of ordinary skill in the art. Such a process is implemented by first determining a desired lens effect profile for lasing medium 12 (i.e. the lens effect profile shown in FIG. 4B), and then inputting the required system parameters into the ray tracing program. Such parameters include: pump cavity geometry (i.e. the geometry of the area defined within reflector 54); optical properties of all components, including lasing medium 12, in the pump cavity; and emission model for lamps 50, 52 describing wavelength and direction dependence of optical radiation emitted therefrom (this may be based on experimental data); and the shape of reflector 54. The ray tracing routine subsequently simulates operation of laser device 10, providing such information as: the path of each ray emitted by the lamps; ray reflection, refraction and absorption by each optical component in the pump cavity; points of ray depletion; and, upon completion, the distribution of the absorbed energy across the width and through the thickness of lasing medium 12 (i.e. a pumping profile). The ray tracing program can also include the computation of the fraction of energy absorbed by the lasing medium which is turned into heat, and hence provide a lens effect profile.

The optimization program, which can comprise, for example, what is commonly known in the art as a SIMPLEX algorithm, compares the results of the lens effect profile generated by the ray tracing program as run with an originally guessed shape for reflector 54, to the desired lens effect profile. The SIMPLEX algorithm is then used to compute successive improvements to the shape of the reflector 54, and rerun the ray tracing program with each improved shape. The programs are terminated when the difference between the desired and calculated lens effect profiles drops below a specified, predetermined error margin.

There is thus provided a method and apparatus for compensating for thermal lensing effects exhibited by the lateral edge regions of a fluid cooled lasing medium in a slab laser. The invention herein permits the entire cross-sectional area of the lasing medium to be efficiently used to generate a high quality laser beam with substantially no thermal lensing distortions.

While preferred embodiments of the invention have been illustrated and described, it will be clear that the invention is not so limited. Numerous modifications, changes, variations, substitutions and equivalents will occur to those skilled in the art without departing from the spirit and scope of the present invention. For example, while the invention herein has been shown as implemented by adjusting the shape of a reflector in a laser device, it is not so limited and may be practiced, for example, by the appropriate positioning of an appropriately shaped lamp so as to stimulate the desired lensing effects in the lasing medium. These desired thermal lensing effects could alternatively be induced by controlling the flow of liquid coolant across the surfaces of lasing medium 12 so as to cause the desired thermal lens affects taught herein. Accordingly, it is intended that the invention herein be limited only by the scope of the appended claims.

What is claimed is:

1. A method of operating a slab laser, said slab laser comprising a solid-state lasing medium having a longitudinally extending lasing axis, pumping means adjacent said lasing medium for impinging electromagnetic radiation upon said lasing medium, and cooling means for flowing a fluid coolant across at least a portion of said lasing medium, said lasing medium exhibiting a negative focal power lens effect in lateral edge portions thereof, said method comprising the steps of:
   (a) introducing a positive focal power lens effect approximately equal in magnitude to said negative focal power lens effect to a central portion of said lasing medium between said lasing medium lateral edge portions, said positive focal power effect being introduced by creating a thermal lens effect in said central portion; and
   (b) passing a beam of coherent light having a wavefront including multiple rays at least twice through said lasing medium in a direction generally along said lasing axis such that said rays in said wavefront traverse alternate regions of positive and negative focal powers of approximately equal magnitudes.

2. The method of claim 1 wherein said central portion of said lasing medium is situated substantially equidistantly between said lasing medium lateral edge portions and extends the length of said lasing medium.

3. The method of claim 2 wherein step (a) is performed by said pumping means introducing a selected amount of heat in said central portion of said lasing medium to create said thermal lens effect.

4. The method of claim 3 wherein said slab laser comprises an optically pumped slab laser; and
   said pumping means comprises at least one lamp for generating optical radiation disposed adjacent said lasing medium, and a reflector surrounding said lamp for directing said optical radiation at selected portions of said lasing medium.

5. The method of claim 4 wherein said reflector has a shape selected to direct said optical radiation so as to introduce said selected amount of heat in said central portion of said lasing medium.

6. The method of claim 5 wherein step (b) is performed using a plurality of optical means disposed proximate the longitudinal ends of said lasing medium for directing said rays generally along said lasing axis.

7. The method of claim 6 wherein said optical means comprise light reflectors.

8. The method of claim 5 wherein said lasing medium is generally rectangular;
   said pumping means disposed so as to direct said optical radiation at at least one major surface of said lasing medium; and
   said cooling means disposed so as to flow said fluid coolant relatively uniformly across at least one major surface of said lasing medium.

9. The method of claim 8, said lasing medium including two optically plane major surfaces extending parallel to each other and parallel to said lasing axis;

said pumping means disposed so as to direct said optical radiation at both of said lasing medium major surfaces; and said cooling means disposed so as to flow said fluid coolant relatively uniformly across both of said lasing medium major surfaces.

10. The method of claim 9 and further including means for passing said beam through said lasing medium in an off axial direction with respect to said lasing axis and at an angle of incidence relative to said lasing medium major surfaces sufficient to produce a plurality of total internal reflections of said beam by said lasing medium major surfaces.

11. The method of claim 10 wherein said cooling means comprises:

an enclosure surrounding said lasing medium; and supports disposed between said lasing medium and an inner surface of said enclosure so that said enclosure and said supports define a separate fluid flow channel adjoining each of said lasing medium faces.

12. Apparatus, comprising:

a solid-state lasing medium having a longitudinally extending lasing axis;

pumping means adjacent said lasing medium for impinging electromagnetic radiation upon said lasing medium;

cooling means for flowing a fluid coolant across at least a portion of said lasing medium;

said lasing medium exhibiting a negative focal power lens effect in lateral edge portions thereof;

means for introducing a positive focal power lens effect approximately equal in magnitude to said negative focal power lens effect to a central portion of said lasing medium between said lasing medium lateral edge portions, said introducing means creating a thermal lens effect in said central portion exhibiting said positive focal power; and means for passing a beam of coherent light having a wavefront including multiple rays at least twice through said lasing medium in a direction generally along said lasing axis such that said rays in said wavefront traverse alternate regions of positive and negative focal powers of approximately equal magnitudes.

13. The apparatus of claim 12 wherein said central portion of said lasing medium is situated substantially equidistantly between said lasing medium lateral edge portions and extends the length of said lasing medium.

14. The apparatus of claim 13, said introducing means comprising said pumping means adapted to introduce a selected amount of heat into said central portion of said lasing medium to create said thermal lens effect.

15. The apparatus of claim 14, said pumping means comprising:

at least one lamp for generating optical radiation disposed adjacent said lasing medium; and a reflector surrounding said lamp for directing said optical radiation at selected portions of said lasing medium.

16. The apparatus of claim 15 wherein said reflector is shaped to direct said optical radiation so as to introduce said selected amount of heat into said central portion of said lasing medium.

17. The apparatus of claim 16, said passing means comprising a plurality of optical means disposed adjacent to the longitudinal ends of said lasing medium for directing said rays generally along said lasing axis.

18. The apparatus of claim 17, said optical means comprising light reflectors.

19. The apparatus of claim 17 wherein said lasing medium is generally rectangular;

said pumping means disposed so as to direct said optical radiation at at least one major surface of said lasing medium; and said cooling means disposed so as to flow said fluid coolant relatively uniformly across at least one major surface of said lasing medium.

20. The apparatus of claim 19, said lasing medium including two optically plane major surfaces extending parallel to each other and parallel to said lasing axis;

said pumping means disposed so as to direct said optical radiation at both of said lasing medium major surfaces; and said cooling means disposed so as to flow said fluid coolant relatively uniformly across both of said lasing medium major surfaces.

21. The apparatus of claim 20 and further including means for passing said beam through said lasing medium in an off axial direction with respect to said lasing axis and at an angle of incidence relative to said lasing medium major surfaces sufficient to produce a plurality of total internal reflections of said beam by said lasing medium major surfaces.

22. The apparatus of claim 21, said cooling means comprising:

an enclosure surrounding said lasing medium; and supports disposed between said lasing medium and an inner surface of said enclosure so that said enclosure and said supports define a separate fluid flow channel adjoining each of said lasing medium surfaces.

* * * * *